Dec. 22, 1970     D. G. MINICK ET AL     3,549,223
POLYMERIC BEARING FOR PAPERMAKING MACHINES
Filed Oct. 27, 1969     2 Sheets-Sheet 1
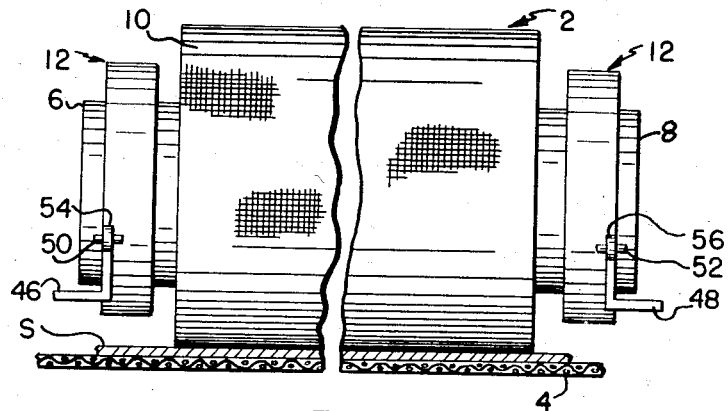
FIG.1
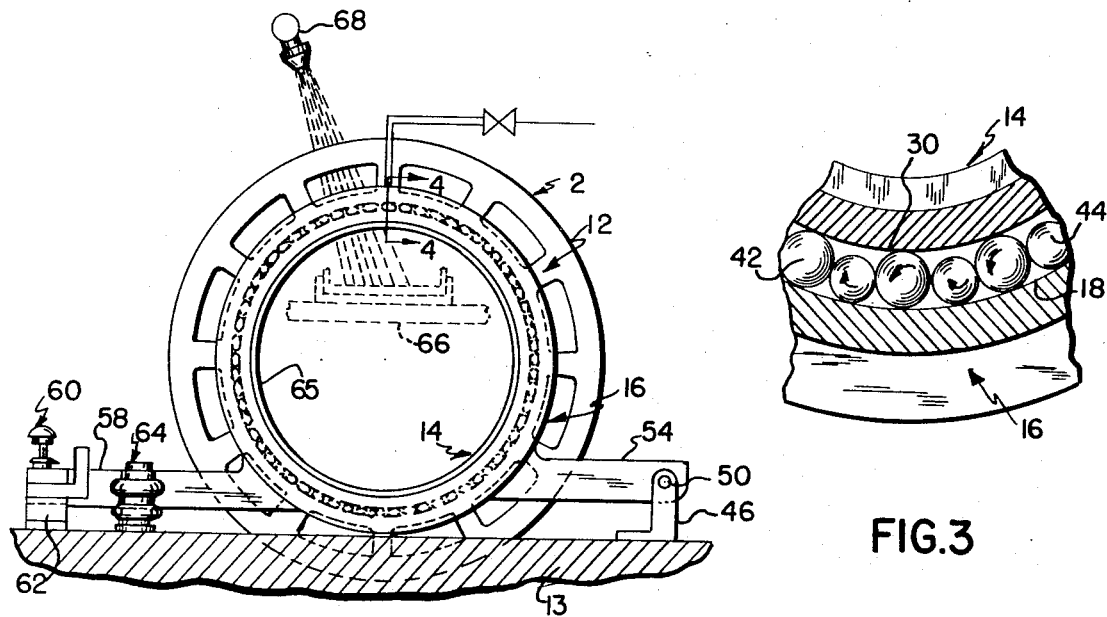
FIG.2
FIG.3
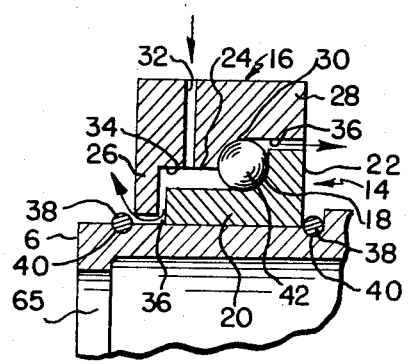
FIG.4
INVENTORS
DAVID G. MINICK
DAVID H. SINCLAIR
BY
*Teare, Teare & Sammon*
ATTORNEYS Dec. 22, 1970    D. G. MINICK ET AL    3,549,223
POLYMERIC BEARING FOR PAPERMAKING MACHINES
Filed Oct. 27, 1969    2 Sheets-Sheet 2

INVENTORS
DAVID G. MINICK
DAVID H. SINCLAIR
BY
Teare, Teare & Sammon
ATTORNEYS

United States Patent Office

3,549,223
Patented Dec. 22, 1970

3,549,223
POLYMERIC BEARING FOR PAPERMAKING MACHINES
David G. Minick, Westfield, and David H. Sinclair, South Hadley, Mass., assignors to The Sinclair Company, Holyoke, Mass., a corporation of Massachusetts
Continuation-in-part of application Ser. No. 720,437, Apr. 4, 1968. This application Oct. 27, 1969, Ser. No. 871,459
Int. Cl. F16c *19/20*
U.S. Cl. 308—200                        8 Claims

ABSTRACT OF THE DISCLOSURE

Dandy roll bearing and support construction having polymeric roller bearing elements disposed between the inner and outer annular race members. Alternate bearing elements are of relatively large diameter with substantially smaller diameter bearing elements disposed therebetween. The large and small diameter elements are formed of different polymeric materials, such that the large elements are relatively hard and rigid to serve as load support elements and the smaller elements are relatively soft and impact resistant.

---

This application is a continuation-in-part of application Ser. No. 720,437, filed Apr. 4, 1968 now abandoned.

BACKGROUND

Generally, the purpose of a dandy roll on a Fourdrinier type papermaking machine is to remove inequalities from the sheet of paper stock and to smooth and finish the same as it is formed on a wire belt. In such machines, the dandy roll is of considerable weight and size and must be supported above the belt for cooperative engagement with the formed sheet. Heretofore, various arrangements have been employed for supporting the dandy roll above the belt, one such arrangement being a set of trunnion wheels at each end of the roll which ride on annular rims extending from the roll head ends. Such trunnion arrangement, however, results in run-out or eccentric operation of the roll when the rims are damaged, worn or eccentrically machined. Non-uniform operation of the roll results in a build-up of paper stock on the roll which disrupts the stock already formed on the belt and products inequalities in the formed sheet.

More recently, efforts have been made to overcome these and other disadvantages by the use of conventional metal ball and/or roller bearings mounted in specially designed housings on the dandy roll lift yoke adjacent the opposed ends of the roll. By this arrangement, the ends of the roll may be open to receive shower pipes and/or drain trays to wash accumulated fiber from the foraminous surface of the roll. A disadvantage of this arrangement, however, resides in the inability to provide a sufficiently large opening through the roll ends, while maintaining an efficient load bearing capacity. For instance, with a dandy roll 30 inches by 200 inches having a weight of about 2,000 lbs., a conventional set of steel ball bearings with a ten-inch I.D. will have an excess load capacity of about 38,000 lbs. or about 19 times greater than that required to support the roll. In addition, conventional metal ball and/or roller bearings require the use of bulky, expensive and precisely machined housings. Furthermore, such conventional bearings fail to compensate for expansion due to thermal variation in the dandy roll frame itself. Such expansion places an excessive thrust load on the bearings and causes premature failure in use.

Further difficulties have been encountered with such conventional metal bearings which result in inefficient operation and/or premature failure. Such failures occur by reason of corrosion of the bearing balls, rollers and/or races when water containing the normal paper mill chemicals, such as lime, talc, titanium and the like, enter through the seals of the bearing and/or housing. Furthermore, such materials clog and otherwise disrupt the smooth, rotary action of the bearing which produces a frictional drag in the bearing with consequent formation of inequalities in the formed sheet.

It has also been proposed in U.S. Pat. No. 2,724,624 to employ bearing elements formed of thermosetting resin, but in practice spalling has been encountered in the use of such bearing elements.

Accordingly, an object of the present invention is to provide a novel bearing and support construction for use in mounting dandy rolls, cylinder molds and similar equipment; which has a compact and inexpensive construction; which incorporates an efficient load bearing capacity; which facilitates a smooth, uniform, rotary action in the bearing; and which has an improved wearlife compared to heretofore known ball and/or roller bearing arrangements.

Another object of this invention is to provide novel roller bearing elements for machinery of the above type which are corrosion proof while substantially eliminating the problem of spalling heretofore encountered in the use of polymeric roller bearings.

Other objects of the present invention are to provide a novel bearing and support construction of the character described for mounting a dandy roll on a papermaking machine; which provides ready accessibility to the interior of the roll for positioning spray pipes and/or trays therein, while maintaining sufficient strength and radial load capacity in the bearing; which prevents excessive thrust loading on the bearing due to thermal variation in the roll; which eliminates corrosive and abrasive action on the bearing elements; which facilitates cleaning and prevents clogging and/or frictional dragging of the bearing; and which provides a smooth, uniform finishing of the paper stock formed on the machine.

Other and more specific objects, features and advantages of the invention will become more fully apparent from the following description taken in conjunction with the accompanying drawings wherein:

FIG. 1 is a fragmentary elevational view, of the novel bearing and support structure for mounting a dandy roll or the like in accordance with the invention;

FIG. 2 is an enlarged end view looking from the left side of FIG. 1 showing a drain pan disposed interiorly of the roll and a shower device mounted exteriorly of the roll for removing accumulated fiber material from the roll;

FIG. 3 is an enlarged fragmentary view partially in section showing the novel bearing race construction of the invention;

FIG. 4 is an enlarged vertical section view taken along the plane indicated by the line 4—4 of FIG. 2;

Figure 5:
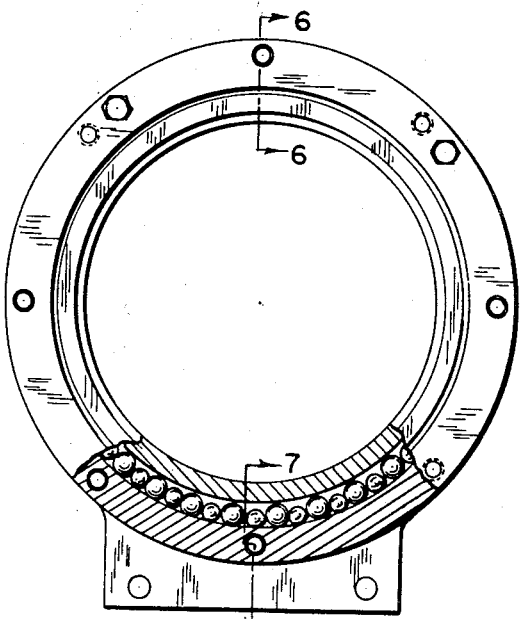
FIG. 5 is an end elevation view showing a modification of the novel bearing and support structure in accordance with the invention.

Referring to the drawings and in particular to the embodiment of FIGS. 1 to 4, the dandy roll, designated generally at 2, is shown for cooperative engagement with a sheet of paper stock S being formed on an endless belt 4 of a Fourdrinier type paper making machine. As seen in FIG. 4, the roll 2 includes outwardly extending, annular flanged heads 6 and 8 which extend from the opposed ends of the roll. A suitable cylindrical frame work (not shown) may be disposed between the flanged heads 6 and 8 for supporting a foraminous member 10, such as a wire mesh screen, which forms the working surface of the roll for smoothing and compacting the stock S.

In accordance with the invention, the opposed ends of the roll 2 may each be provided with a bearing and support mechanism 12 for rotatably mounting the foraminous member 10 on the machine frame 13 above the stock S. The supports 12 are of similar construction so that the following description will proceed with reference to only one thereof, such as that shown in FIGS. 2 to 4. In such embodiment, each support 12 includes annular inner and outer race members 14 and 16. The inner race member 14 may be mounted on the flanged head 6, while the outer race member 16 may be disposed for rotational movement on the inner race member 14. The inner race member 14 in this form may be generally L-shape in cross-section and may have an annular raceway 18 disposed at the juncture between a pair of angularly disposed leg portions 20 and 22.

The circumferentially disposed outer race member 16 is preferably of a generally complementary L-shape in cross-section, but includes an annular shoulder portion 24 disposed between a pair of angularly disposed leg portions 26 and 28. In this form, an annular raceway 30 may be disposed generally adjacent the juncture of the shoulder 24 with the leg portion 28 and in predetermined axially spaced relationship with respect to the raceway 18 on the inner race member 14. The outer race member 16 preferably includes an inlet passageway 32 to provide for the admittance of a lubricant and/or coolant, such as water, into the cavity 34 defined between the respective race members 14 and 16. The outer race member 16 is preferably radially spaced from the inner race member 14 by a distance sufficient to provide a pair of axially extending outlet passageways 36 to discharge the lubricant and/or coolant from the cavity 34. By this arrangement, an effective "flushing action" is provided in the bearing to remove the corrosive and abrasive paper mill chemicals which result from the paper making operations, thereby maintaining an effective cleansing and cooling action of the bearing while achieving an efficient lubrication thereof.

As best shown in FIG. 4, a pair of annular members 38, such as rubber O-rings, may be disposed in annular recessed grooves 40 provided on the flanged head 6 adjacent the opposed sides of the inner 14 and outer 16 race members, respectively. Due to the resilient compressive characteristics of the members 38, a predetermined slight axial movement may take place between the outer race member 16 and the inner race member 14, and between the inner race member 14 and the flanged head 6 to compensate for expansion of the dandy roll due to variations in the thermal operating conditions of the roll. Such predetermined axial movement of the race members effectively eliminates excessive thrust forces on the bearings, thereby substantially increasing the wear-life thereof. Preferably, the inner/or outer race members may comprise an abrasion and corrosion resistant metallic or non-metallic material, such as bronze, brass, stainless steel, or suitable polymeric material, such as nylon, to reduce abrasive wear on the bearings and to reduce the corrosive effects from the paper mill chemicals.

In accordance with this invention a plurality of bearing elements which may be in the form of rollers or balls are disposed for antifriction rolling contact between the raceways 18 and 30. The elements, which will hereafter be called "balls," are of two sizes and are alternately arranged between the raceways. The larger diameter balls 42 and the smaller diameter balls 44 are both formed of polymeric material and are disposed in abutting relationship, as shown in FIG. 3. With this arrangement the larger balls 42 provide the primary load supporting means, while the smaller balls serve as impact-absorbing spacers.

The load bearing balls 42 are formed of a relatively hard and strong material having a hardness greater than about 60, as measured on the Rockwell scale, and a compressive strength greater than about 6500 p.s.i. as determined by ASTM Test Method D-695. The smaller diameter balls 44 are fabricated of a material which is substantially softer and of greater impact strength than the larger balls. For example, it has been found that a material having a hardness of about 40–70 (Shore Hardness) and an impact strength of not substantially less than 5 ft.-lb./inch notch (Izod Test), ASTM Test Method D-256.

Examples of suitable materials for use in the fabrication of the load bearing elements include the polyamides, such as nylon, the acetal polymers, such as "Delrin," and polycarbonate and polyester resins. For the smaller diameter balls the materials selected for use may be a suitable polyolefin, such for example, as polytetrafluoroethylene (Teflon) or polyethylene, particularly in the low and medium density range. Materials of this type have high impact strength and also have the added advantage of a very low coefficient of friction which in effect imparts a lubricity to the bearing rolls. For example, low density polyethylene has an impact strength in excess of 16 ft.-lb./inch notch (Izod), a hardness of about 41–46 (Shore Hardness), while nylon molding compound type 6 has a Rockwell Hardness of 103–118 with an impact strength of 1.0–3.6-ft.lb./inch notch (Izod).

In attempting to use polymeric bearing elements formed of the same material it was found that the balls were subject to chipping or spalling. As the large, load bearing balls are released from a maximum load condition, in a dandy roll or cylinder mold, they tend to "shoot out" and strike against the smaller diameter rolls. With this impact, ball material of the same hardness and impact strength is quite easily damaged and the bearing balls must, therefore, be frequently replaced.

In accordance with this invention, a combination of two materials, such as a strong, hard polyamide, acetal polymer or polycarbonate is used in the fabrication of the larger rolls, and a substantially softer material of high impact strength, such as polyethylene, is employed for the smaller balls. With this relationship of material properties, it has been found that problem of spalling is substantially eliminated. Moreover, the utilization of polymeric materials in the formation of the bearing elements provides a smooth rotary operation for the dandy roll and the bearing elements are not subject to corrosion or contamination by the paper mill chemicals.

The support for the dandy roll 2, which may be of similar construction at each of the opposed ends, includes a pair of brackets 46 and 48 (FIG. 1) mounted on the machine frame 13 (FIG. 2). To each bracket may be pivotally attached, as at 50 and 52, yoke arms 54 and 56 which may be integrally attached to the respective outer race members 16. As shown in FIG. 2, another pair of yoke arms 58 (only one being shown) may be integrally attached to the outer race member 16 on the side opposite the yoke arms 54 and 56. The free ends of the respective arms 58 may be operably connected to an adjustable stop device 60 (only one being shown) mounted by means of a bracket 62 on the machine frame 13. To change the relative height of the roll 2, the device 60 may be actuated, to raise or lower the roll about the pivots 50 and 52 to position the foraminous member 10 in the desired operating position relative to the paper stock S. By this arrangement, the respective outer race members 16 of the bearing, provide the mounting yoke for the dandy roll, thereby eliminating the bulky and expensive housing construction heretofore required for enclosing the components of the bearing. In some cases, a fluid actuated device 64 (FIG. 2), such as of the pneumatic air lift type, may be operably connected to the respective yoke arms 58 when automatic positioning of the roll is desired.

As will be seen in FIGS .2 and 4, the maximum transverse dimension (diameter) of the outer bearing and support mechanism 12 is generally the same as the outside diameter of the dandy roll to provide an opening 65 in the flanged head 6 for ready access to the interior of the roll. By this arrangement, a suitable drain tray 66 may be supported interiorly of the roll, while a shower or spray device 68 may be disposed exteriorly of the roll to wash accumulated fibers from the exterior surface of the foraminous member 10 during operation of the roll.

Figure 10:
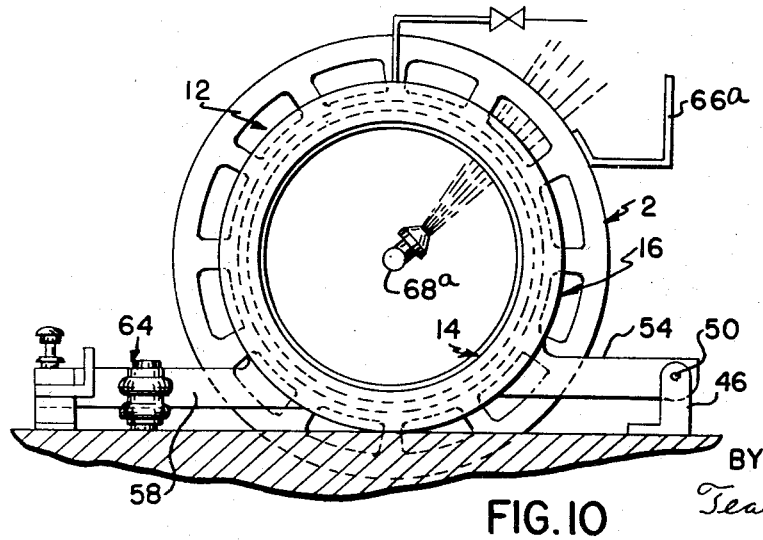
FIG. 10 is an end elevational view showing a further modification of the invention wherein a shower device is disposed interiorly of the roll and a drain pan is mounted exteriorly of the roll.

As shown in the modification of FIG. 10, the drain tray 66a may be mounted on the exterior of the roll 2 while the shower or spray pipe device 68a may be supported interiorly of the roll 2 when it is desired to wash accumulated material from the interior surface of the foraminous member 10. In a typical construction, the inside diameter of the opening 65 may be about 20 inches, while the outside diameter of the dandy roll is about 24 inches. This relationship provides maximum accessibility to the interior of the roll, while providing optimum strength and support characteristics for the bearing opening.

Figure 6:
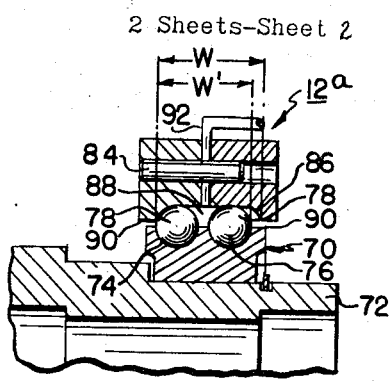
FIG. 6 is a vertical section taken along the plane of line 6—6 of FIG. 5.
Figure 7:
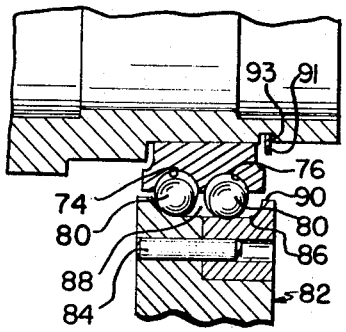
FIG. 7 is a vertical section view taken along the plane of line 7—7 of FIG. 5.

IN FIGS. 5 to 7 there is shown a modification of the invention wherein the novel bearing and support mechanisms 12a are of a slightly modified construction. In this form, the inner race member 70 is mounted on the flanged head 72 of the dandy roll, but each includes a pair of spaced parallel, annular generally semi-circular raceways 74 and 76 adapted to receive in anti-friction rolling coaction a double-roll series of alternately spaced larger (78) and smaller (80) size (diameter) polymeric balls. The outer race member 82 may be of a two-part construction connected together by pins 84. The outer race member 82 includes a single, generally U-shaped raceway 86 which defines a cavity 88 with the inner race member 70. Here again, the race members 70 and 82 may be radially spaced apart a distance sufficient to provide axially extending outlet passageways 90 to "flush" the fluid lubricating media introduced into the cavity 88 through an inlet passageway 92 provided in the outer race member 82. Similarly, the raceways 74, 76, and 86 may be of a corrosion and abrasion resistant material for the purposes and advantages, as aforesaid.

In this embodiment, the raceway 86 of the outer race member 82 is preferably of a greater transverse width W as compared to the transverse width W' of the combined inner raceways 74 and 76 to provide a predetermined axial movement of the inner race member 70 relative to the outer race member 82 due to the thermal variations during operation of the dandy roll. In this form, an annular ring 91 may be disposed in recessed groove 93 provided adjacent the outer end of the flanged head 72 to provide an abutment for limiting axial movement of the inner race member 70 in the assembled position thereof. In a typical construction, the dimension W is preferably about ⅛-inch to ¼-inch greater than the dimension W' which relationship effectively eliminates excessive thrust loads generated by such thermal operating conditions.

Figure 8:
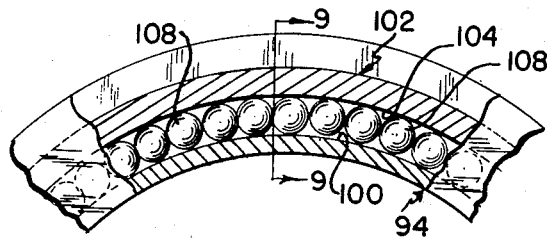
FIG. 8 is an enlarged fragmentary view partially in section showing a further modification of the novel bearing race construction of the invention.
Figure 9:
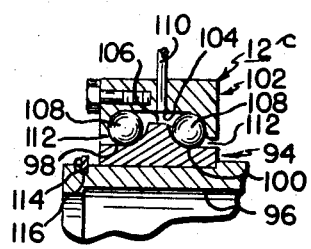
FIG. 9 is a vertical section view taken along the plane of line 9—9 of FIG. 9.

In FIGS. 8 and 9 there is illustrated another modification of the invention wherein the novel bearing and supports 12c each include an inner race member 94 attached to the flanged head 96 of the dandy roll, but wherein each inner race member 94 has a generally T-shaped configuration in cross-section defined by a pair of parallel, generally arcuate raceways 98 and 100. In this form, the outer race member 102 similarly has a single, generally U-shaped raceway 104 which defines with the inner race member 94 a cavity 106 therebetween. However, in this embodiment a double-roll of polymeric balls 108 having an equal size (diameter) may be disposed for anti-friction rolling coaction between the respective raceways. Here again, the outer race member 102 may be provided with an inlet passageway 110 and spaced a sufficient distance radially from the inner race member 94 to provide axially extending outlet passageways 112 to cleanse and lubricate the bearings. An annular ring 114 (FIG. 9) may also be disposed in a recessed groove 116 in the flanged head 96 to provide an abutment for limiting axial movement of the inner race core member 94, as aforesaid.

In the description hereinbefore given, the invention has been illustrated with reference to the operation of a dandy roll for use with paper making machines, but it is to be understood that the novel bearing and support construction of the invention may be employed with other equipment, such as cylinder molds and other similar equipment, in accordance with the principles herein set forth.

Having thus described the invention, what is claimed is:

1. A bearing support for a rotatable member comprising first and second race members, a plurality of polymeric bearing elements disposed for anti-friction rolling coaction between said race members, said elements including load bearing roll elements and roll elements interposed between adjacent pairs of said load bearing elements and being substantially smaller in diameter, said load bearing elements being formed of polymeric materials of different physical properties from said small diameter elements, the latter being a relatively more impact resistant material than the load bearing elements.

2. A bearing support for a rotatable member comprising first and second race members, a plurality of polymeric roller bearings disposed for anti-friction rolling coaction between said race members, said roller bearings including relatively large diameter load bearing rolls with substantially smaller diameter rolls interposed between adjacent load bearing rolls, said load bearing rolls and small diameter rolls being formed of different polymeric materials, said load bearing rolls being formed of a first polymer which is relatively hard, and said small diameter rolls being formed of a second polymer which is substantially softer and of higher impact strength than said first polymer, whereby said small rolls serve to cushion the impact between the rolls of said bearing.

3. A bearing support as set forth in claim 2 in which the load bearing rolls have a compressive strength of greater than 7000 p.s.i. and said small diameter rolls have an impact strength of greater than 5 ft.-lb./inch notch (Izod Test).

4. A bearing support as set forth in claim 2 in which the load bearing rolls are formed of a material selected from the group consisting of polyamide, acetal polymer, polyester and polycarbonate and said small diameter rolls are formed of a material selected from the group consisting of polyethylene, polytetrafluoroethylene, and polypropylene.

5. A bearing support as set forth in claim 2 in which said race members are composed of common resistant materials and in which the outer race is axially movable relative to the inner race.

6. A bearing support as set forth in claim 5 in which said race members include inlet and outlet passageway means for entry of lubricating media to said bearing elements.

7. A bearing support as set forth in claim 6, including yoke arm means fixedly attached to said outer race member adjacent the side opposite said pivotal yoke means, and adjustable stop means operably connected to said yoke arm means for selectively controlling pivotal movement of said roll relative to said support.

8. A bearing support as set forth in claim 6, including a fluid spray means disposed interiorly of said roll, and a drain tray means mounted exteriorly of said roll.

References Cited
UNITED STATES PATENTS 2,724,624  11/1955  Barr _____ 308—200

FRED C. MATTERN, Jr., Primary Examiner
F. SUSKO, Assistant Examiner